May 22, 1934.   G. A. BUEHLE   1,959,901
MEANS FOR MOUNTING WHEELS UPON SHAFTS
Filed April 4, 1933   2 Sheets-Sheet 1
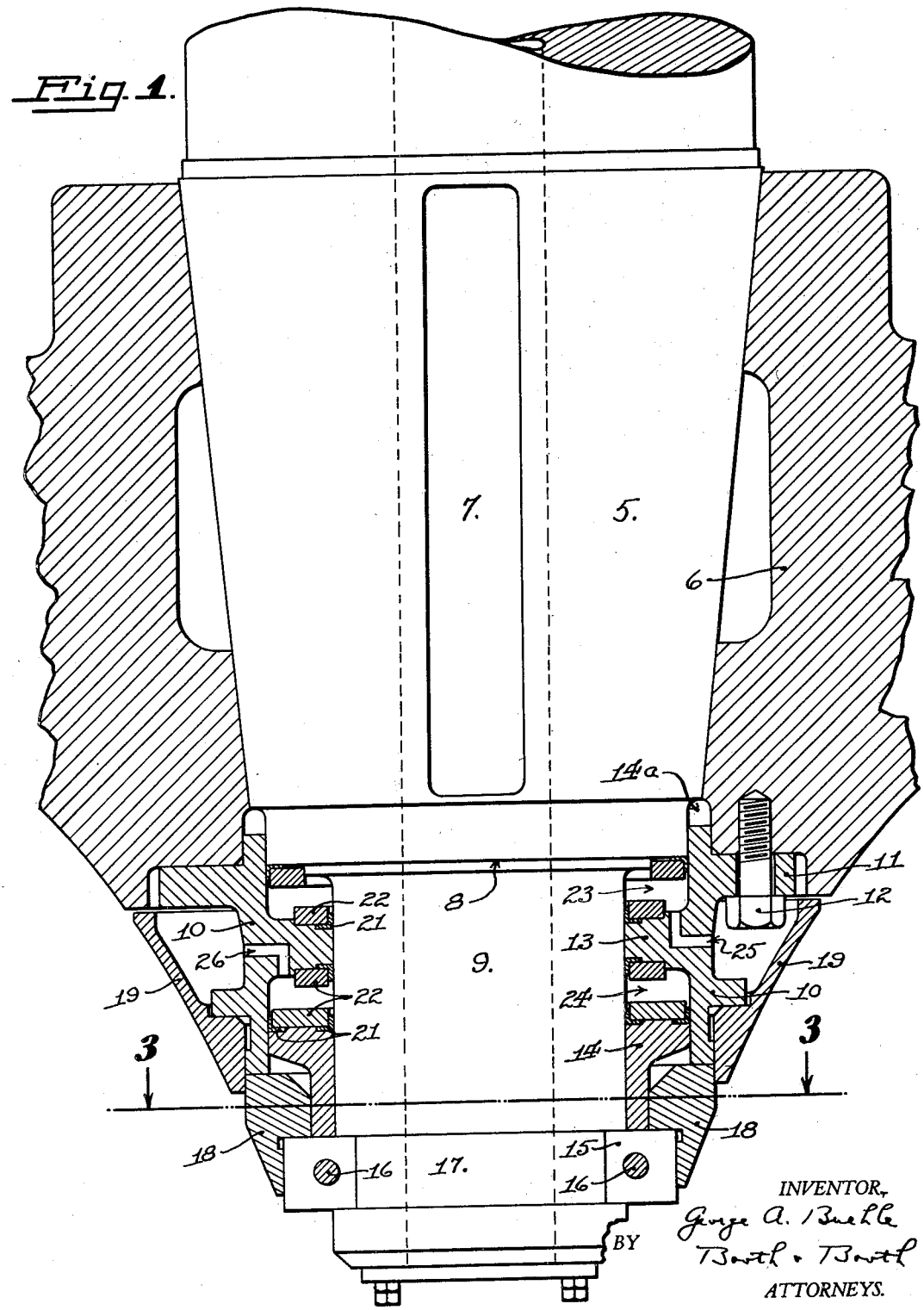

May 22, 1934.   G. A. BUEHLE   1,959,901
MEANS FOR MOUNTING WHEELS UPON SHAFTS
Filed April 4, 1933    2 Sheets-Sheet 2
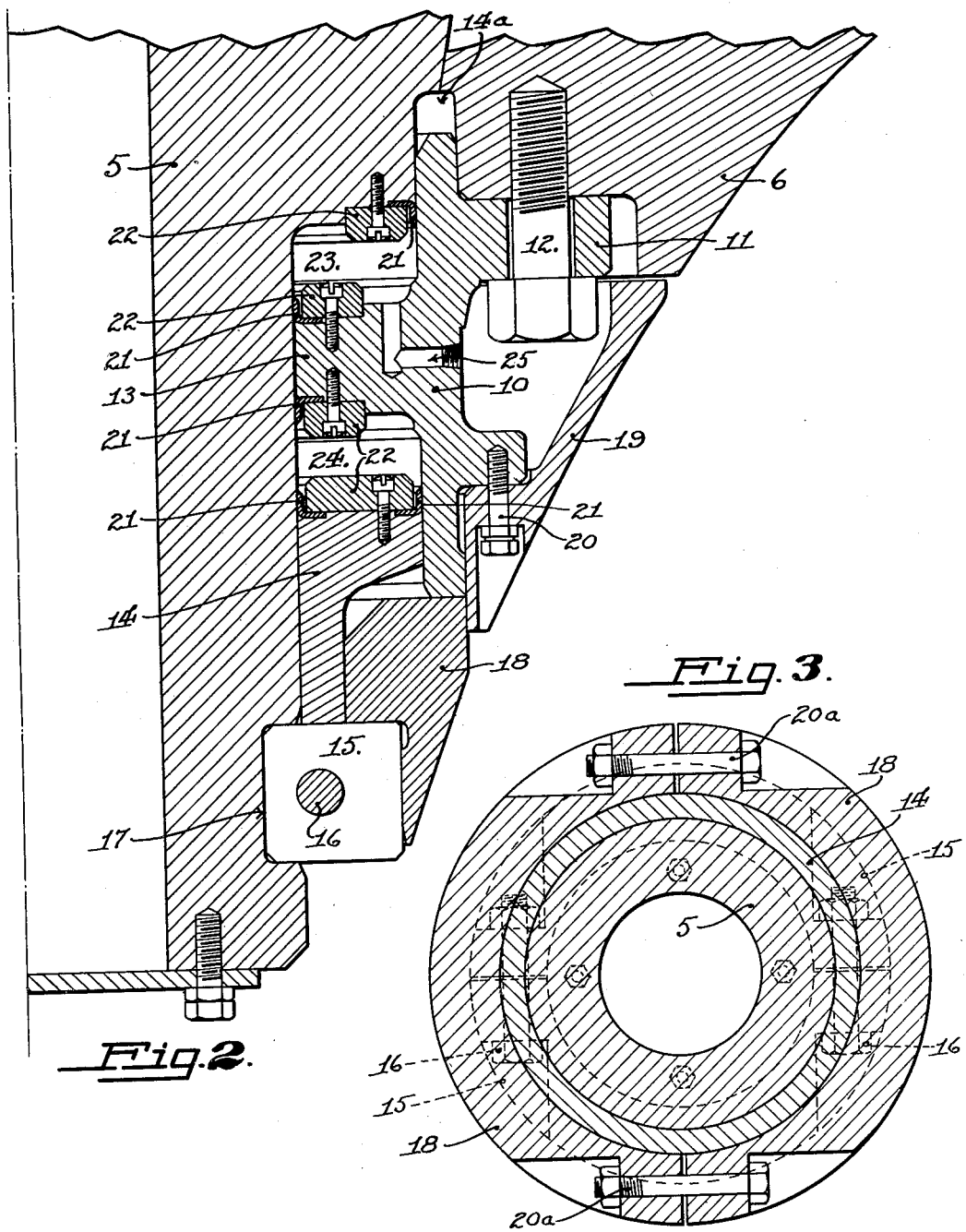

Patented May 22, 1934

1,959,901

UNITED STATES PATENT OFFICE 1,959,901

MEANS FOR MOUNTING WHEELS UPON SHAFTS

George A. Buehle, Burlingame, Calif., assignor to The Pelton Water Wheel Company, San Francisco, Calif., a corporation of California Application April 4, 1933, Serial No. 664,325

8 Claims. (Cl. 287—53)

The present invention relates to means for removing, replacing, and securing wheels upon shafts, and is especially applicable to heavy machinery such for example as the runners of water wheels or turbines used for driving electric generators.

It is customary, in such machines, to secure the runner or wheel to the shaft by a flanged and bolted connection. In removing and replacing the wheel, which must be done occasionally in ordinary maintenance operations, it is necessary to ream the bolt holes and install new bolts of slightly larger size, and after a number of replacements, the bolt holes become too large for safety, and both shaft and wheel must be scrapped. In order to obviate this objection, wheels of the above described type are sometimes secured to their shafts by tapered and keyed connections, which permit a greater number of replacements, but which require more elaborate equipment for seating the wheel tight upon the tapered shaft and for breaking it loose therefrom. The great weight of the wheel, which may exceed fifty tons, and the force necessary to seat or unseat it, which may amount to several hundred tons, render this a difficult operation.

The principal object of the present invention is to provide means which can be easily operated to force the wheel on or off a tapered shaft, and which can be left in place after the wheel is secured, forming a part of the machine and serving to hold the wheel securely upon the shaft. By the use of my invention, the time required to remove and replace a wheel is reduced to a minimum, and an indefinite number of replacements can be made without damage to either wheel or shaft.

The invention is herein illustrated and described, by way of example, as applied to the runner of a vertical shaft hydraulic turbine. It will be apparent to those skilled in the art, however, that the invention may be applied, without material change, to other types of machinery having either vertical or horizontal shafts. It is also to be understood that changes in the form, construction and arrangement of the several parts may be made, within the limits of the claims hereto appended, without departing from the spirit of the invention as defined in said claims.

Reference should be made to the accompanying drawings, in which:—

Fig. 1 is a vertical central section of portions of the runner and shaft of a hydraulic turbine with which is associated a preferred embodiment of my invention.

Fig. 2 is a detailed vertical section on a larger scale, showing the pressure chambers of the invention.

Fig. 3 is a transverse section on the line 3—3 of Fig. 1.

In the drawings, the reference numeral 5 designates the shaft, and 6 is the runner or wheel secured to the lower end thereof. The shaft is tapered, as shown, and the hub of the wheel is correspondingly tapered to fit snugly thereon. One or more keys 7 are provided to prevent rotation of the wheel upon the shaft. Below its tapered portion, the shaft has a shoulder 8 and a cylindrical portion 9 of reduced diameter. A cylinder member 10, having an exterior flange 11 secured by bolts 12 to the bottom of the wheel 6, has also an interior flange 13 bored to a free sliding fit upon the cylindrical portion 9 of the shaft. A ring 14 fits upon the lower end of said cylindrical shaft portion, and its outer periphery is a free sliding fit in the lower end of the cylinder member 10. The cylinder member 10 is accurately centered with respect to the shaft and the wheel by having its upper end seated in an annular groove 14a formed between said shaft and wheel.

The ring 14 rests upon a split ring 15, whose halves are held together by bolts 16, and which is seated in a groove 17 in the shaft. A second split ring 18, having the cross section shown in Figs. 1 and 2, fits snugly between the top of the first split ring 15 and the bottom of the cylinder 10. A conical annular shield 19 fits over the outside of the cylinder 10 and is secured thereto by bolts 20, Fig. 2. The lower end of said shield fits closely about the upper split ring 18, holding it in place, and its exterior forms a continuation of the stream-lined form of the wheel hub. If necessary, the upper split ring 18 may be additionally held together by bolts 20a, Fig. 3.

Suitable packing means, shown in Fig. 2 as cup leathers 21 secured by bolted rings 22 to the shaft shoulder 8, the cylinder flange 13, and the upper end of the ring 14, seal the joints between these parts, forming two pressure chambers or cylinders 23 and 24 respectively above and below the flange 13. Pressure connections are provided for the chambers 23 and 24, and are indicated as holes 25 and 26, Fig. 1, which are preferably tapped as shown in Fig. 2 to receive pipes, not shown, leading from a pump or other source of fluid (preferably oil) under pressure.

With the parts assembled as shown in the drawings, the wheel is securely held to its seat upon the shaft by the cylinder 10 and the split rings 18 and 15, which form a rigid mechanical connection between the bottom of the wheel hub and the shaft groove 17. When it is desired to remove the wheel, the shield 19 and the upper split ring 18 are removed. Suitable temporary supporting members, not shown, are placed beneath the wheel to control its descent. Then fluid under pressure is introduced into the chamber 23, the effect thereof being to press down on the cylinder 10 and wheel 6 and up on the shaft, thereby breaking the wheel loose from its tapered seat on said shaft. If desired, pressure fluid can also be introduced into the chamber 24 to cushion the initial drop of the wheel until it is supported entirely by the exterior temporary supporting members (not shown). The final step consists in disconnecting the pressure supply, removing the lower split ring 15 and the shaft ring 14, and lowering the wheel by said temporary supporting members in the usual manner.

The new wheel is installed by a process the exact reverse of the above. A cylinder 10, which may be the same one removed from the old wheel, is secured to the hub of the new wheel, which is then raised almost to its final position by the usual temporary supporting members. The shaft ring 14 and lower split ring 15 are placed upon the shaft; pressure fluid is pumped into the chamber 24 to force the wheel upward to its final seat upon the tapered shaft; the upper split ring 18 is machined to proper width to make it a close fit between the lower split ring 15 and the bottom of the cylinder 10, and is installed; and finally the pressure connections are removed and the shield 19 placed in position. The pressure chambers 23 and 24 are preferably left full of oil, and sealed, to exclude water and prevent corrosion.

Obviously, if the machine is of that type in which the bottom parts are permanently enclosed in concrete so that the entire rotor must be pulled out from above, the operation of removal and replacement will be different to the extent that the shaft and wheel are first removed through the top of the machine by a crane, and lowered to rest the wheel upon suitable blocking on the power-house floor. Then after breaking the tapered joint loose as described above, the shaft is lifted out of the wheel by the crane and lowered again into the new wheel. The means for seating and unseating the wheel, and the operation thereof, are exactly the same as described in the preceding paragraphs.

It will be seen that the invention includes both means for seating and unseating the wheel, and means for permanently holding it in seated position. It will also be readily understood by those skilled in the art that the mechanical operations involved either in removing or replacing the wheel are simple and can be done with minimum loss of time and at little expense. Aside from providing the temporary supporting members, which are necessary no matter what form of connection is used between wheel and shaft, the only operations in removing the wheel are the simple removal of the shield 19, the split rings 18 and 15, and the shaft ring 14, and connecting the source of fluid pressure. In installing the wheel, these same operations are performed in reverse order, and the only machining required is that necessary to fit the upper split ring 18 accurately. This split ring 18, if too narrow to use again, can be scrapped at insignificant expense. Furthermore, if at any time during the operation of the wheel, it should become loose on its shaft, it can be tightened merely by applying pressure to the chamber 24 and fitting and installing a new upper split ring. Thus all the inherent advantages of the tapered mounting are retained, without its former disadvantages of difficulty of removal, replacement, and locking. However, the invention is not limited to use with tapered shafts, but may be used with straight cylindrical or other forms of connections to equal advantage.

I claim:—

1. In combination with a shaft and a wheel seated thereon, fluid pressure actuated means for producing relative movement between said shaft and said wheel whereby said wheel may be seated or unseated, and removable locking members cooperating with said pressure actuated means for permanently holding said wheel upon its seat.

2. In combination with a shaft and a wheel seated thereon, said shaft and said wheel being formed to provide a fluid pressure chamber between them, a connection for admitting fluid under pressure to said chamber whereby said wheel may be moved relative to said shaft, and removable locking means engaging said shaft and wheel to prevent said relative movement.

3. In combination with a shaft member and a wheel member seated thereon, one of said members having a cylindrical portion with shoulders at each end, one of said shoulders being a removable ring; means for holding said ring in position; a flanged cylinder carried by the other member, the flange thereof closely fitting the cylindrical portion of the first member and forming pressure chambers between said flange and said shoulders; and connections for admitting fluid under pressure to said chambers to produce relative movement in either direction between said members.

4. In combination with a shaft member and a wheel member seated thereon, one of said members having a cylindrical portion with shoulders at each end, one of said shoulders being a removable ring; means for holding said ring in position; a flanged cylinder carried by the other member, the flange thereof closely surrounding the cylindrical portion of the first member and forming pressure chambers between said flange and said shoulders; connections for admitting fluid under pressure to said chambers to produce relative movement between said members whereby said wheel member may be seated or unseated; and removable locking means connecting said ring holding means and said cylinder to hold said wheel member seated.

5. In combination with a shaft and a wheel seated thereon, said shaft having a cylindrical portion with a shoulder at one end and a groove at the other; a removable ring surrounding said cylindrical portion and forming a second shoulder spaced from the first shoulder; a split ring seated in said groove for holding said shoulder ring in position; a cylinder formed in said wheel and surrounding said shoulders, said cylinder having a flange closely surrounding said shaft between said shoulders; connections for admitting fluid under pressure between said flange and said shoulders to move said wheel upon said shaft; and removable locking members between said split ring and said cylinder to hold the wheel seated upon the shaft.

6. In combination with a shaft and a wheel seated thereon, said shaft having a cylindrical portion with a shoulder at one end and a groove at the other; a removable ring surrounding said cylindrical portion and forming a second shoulder spaced from the first shoulder; a split ring seated in said groove for holding said shoulder ring in position; a cylinder formed in said wheel and surrounding said shoulders, said cylinder having a flange closely surrounding said shaft between said shoulders; connections for admitting fluid under pressure between said flange and said shoulders to move said wheel upon said shaft; a second split ring interposed between the first split ring and the end of said cylinder to hold the wheel seated upon the shaft; and means for removably holding said split rings in position.

7. In combination with a shaft and a wheel seated thereon, said shaft having two cylindrical portions of different diameter separated by a shoulder; a cylinder member having an exterior flange permanently secured to the hub of said wheel, the interior of said cylinder member having portions of different diameter fitting closely about said shaft portions to form a pressure chamber; and means for introducing fluid pressure to said chamber to move said wheel along said shaft.

8. In combination with a shaft and a wheel seated thereon, said shaft having two cylindrical portions of different diameter separated by a shoulder; a ring removably secured upon the smaller shaft portion and spaced from said shoulder; a cylinder member permanently secured to the hub of said wheel and fitting closely about said ring and the larger shaft portion; an interior flange upon said cylinder member fitting closely about the smaller shaft portion between said ring and said shoulder to form two oppositely operating pressure chambers; and means for introducing fluid pressure to said chambers to move the wheel along the shaft in either direction.

GEORGE A. BUEHLE.